United States Patent [19]

Dichter

[11] Patent Number: 4,830,654
[45] Date of Patent: May 16, 1989

[54] APPARATUS FOR SHAPING THE NECK OF GLASS BOTTLES PRODUCED FROM GLASS TUBES

[76] Inventor: Hans-Joachim Dichter, Sachsendamm 93, 1000 Berlin 62, Fed. Rep. of Germany

[21] Appl. No.: 150,641
[22] PCT Filed: Apr. 15, 1987
[86] PCT No.: PCT/DE87/00175
 § 371 Date: Dec. 7, 1987
 § 102(e) Date: Dec. 7, 1987
[87] PCT Pub. No.: WO87/06223
 PCT Pub. Date: Oct. 22, 1987

[30] Foreign Application Priority Data
 Apr. 17, 1986 [DE] Fed. Rep. of Germany ....... 3613212

[51] Int. Cl.⁴ ............................................. C03B 23/04
[52] U.S. Cl. ....................................... 65/280; 65/108
[58] Field of Search ................. 65/48, 68, 71, 87, 108, 65/241, 244, 280, 272, 276, 292

[56] References Cited

U.S. PATENT DOCUMENTS

| | | | |
|---|---|---|---|
| 1,962,985 | 6/1934 | Dichter | 65/280 X |
| 2,491,762 | 12/1949 | Piszel | 65/280 |
| 2,935,819 | 5/1960 | Dichter | 65/280 X |
| 3,222,157 | 12/1965 | Dichter | 65/280 |
| 3,424,570 | 1/1969 | Couquelet | 65/276 |
| 3,472,643 | 10/1969 | Ogle | 65/292 |
| 3,880,637 | 4/1975 | Dichter | 65/280 X |
| 4,092,142 | 5/1978 | Dichter | 65/280 X |
| 4,441,908 | 4/1984 | Zauner | 65/280 X |

FOREIGN PATENT DOCUMENTS 1224451 9/1966 Fed. Rep. of Germany .
 1809489 6/1970 Fed. Rep. of Germany .
 3405291A1 8/1985 Fed. Rep. of Germany .

*Primary Examiner*—Robert L. Lindsay
*Attorney, Agent, or Firm*—Mark P. Stone

[57] ABSTRACT

In an apparatus for shaping the neck of small glass bottles (28) produced from tubes, shaping rollers (14, 15) are arranged on a guide mount (5) which can execute a movement parallel to the longitudinal axis (29) of the glass bottles (28) and which affords the possibility of combining the rolling movement with a drawing movement during the shaping of the neck (27) of the glass bottle (28), in order thereby to prevent adverse accumulations of material.

2 Claims, 1 Drawing Sheet

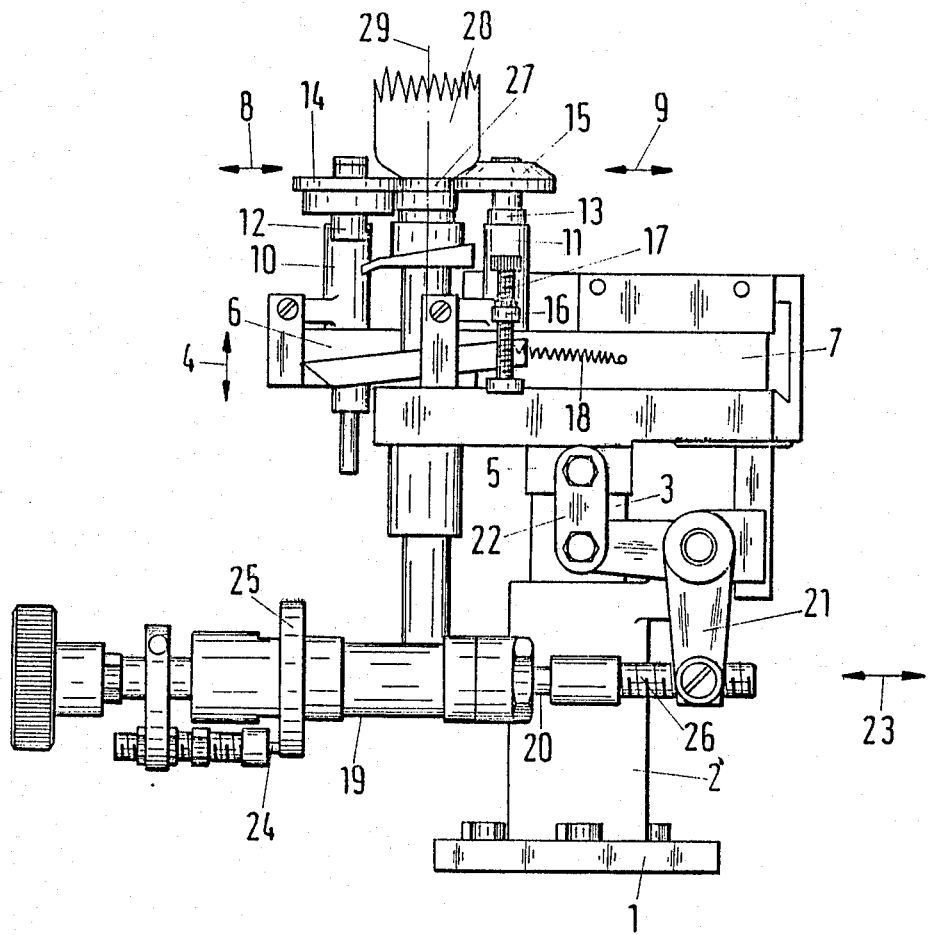

APPARATUS FOR SHAPING THE NECK OF GLASS BOTTLES PRODUCED FROM GLASS TUBES

The invention relates to an apparatus for shaping the neck of a small glass bottle produced from a glass tube, with shaping rollers mounted resiliently on slides moveable to and fro perpendicularly relative to the longitudinal axis of the glass bottle.

An apparatus of the abovementioned type and of a similar design is known from German Offenlegungsschrift 1,224,451. It has been shown that use of the known apparatus presents problems when comparatively large glass bottles of small size are produced by it, that is to say when tubes of a diameter of approximately 30mm and above are processed. In such cases, there are difficulties in distributing the material displaced out of the neck zone of the glass bottle, and there may be inadmissible dimensional deviations as regards the wall thickness of the bottles in the region of their welt, their neck and especially their shoulders.

The object on which the invention is based is to provide an apparatus of the type in question, in which the problems mentioned are overcome, that is to say by means of which it is possible in a simple way to produce from tubes glass bottles, the dimensions of which meet the set requirements, even when the volume of glass to be displaced by the shaping rollers is relatively large. According to the invention, this object is achieved by the fact that the slides are guided in a guide mount moveable up and down parallel to the longitudinal axis of the glass bottle.

The apparatus according to the invention makes it possible to displace considerable quantities of material out of the neck region of the glass bottle into its shoulder region and at the same time, as a result of a movement of the shaping rollers parallel to the longitudinal axis of the glass tube, counteract the formation of thickened portions in the shoulder region, there being the additional possibility of varying the angle of inclination of the shoulder part. Because of the more uniform distribution of the volume of glass as a result of the drawing operation superposed on the rolling operation, bottles with a larger filling content than hitherto can be produced at the same outlay in terms of material.

An exemplary embodiment of the invention is illustrated in the accompanying drawing, in which 1 denotes a stand carrying a bracket 2 for a column 3, on which a guide mount 5 for slides 6 and 7, which can execute to-and-fro movements in the directions of the double arrows 8 and 9, is mounted so that it can be shifted up and down in the direction of the double arrow 4. Mounted on the slides 6 and 7 are pivoting sleeves 10 and 11 carrying extension arms 12 and 13, on the free ends of which shaping rollers 14 and 15 are arranged. As shown by the example of the pivoting sleeve 11, the height of the pivoting sleeves 10 and 11 can be varied by means of an adjusting screw 17 which is guided into a further extension arm 16 and on which engages a spring 18 anchored on the slide 7 and allowing resilient compensating movements of the pivoting sleeve 11 and of the shaping roller 15 carried by the latter.

In order to subject the guide mount 5 to the up-and-down movement in the direction of the double arrow 4, there is a compressed-air unit 19, the piston rod 20 of which is connected to the guide mount 5 via an angle lever 21 and a coupling plate 22. The extent of the to-and-fro movements of the piston rod 20 in the direction of the double arrow 23 can be set by means of an adjustable stop 24, to which a fixed abutment 25 on the compressed-air unit 19 is assigned. To make it possible also to adjust the height of the guide mount 5, a threaded bolt 26 is mounted rotatably on the piston rod 20 and is screwed into a screw bush (not shown) mounted pivotably and so as to be moveable up and down on the end of the lower arm of the angle lever 21.

During the shaping of the neck 27 of a glass bottle 28, the shaping rollers 14, 15 are first moved towards one another perpendicularly relative to the longitudinal axis 29 of the glass bottle 28. Subsequently or, if appropriate, even at the same time, there is a downwards movement of the guide mount 5 together with the shaping rollers 14, 15, in order to reduce or prevent a build-up of material next to the neck 27. As a result of the additional possibility of axial movement of the shaping rollers 14, 15, a comparatively wide zone of material can be heated, and the danger that undesirable internal stress will be generated in the neck region and shoulder region of the glass bottle 28 is counteracted.

I claim:

1. An apparatus for shaping the neck (27) of a small glass bottle (28) produced from a glass tube, said apparatus comprising shaping rollers (14,15) resiliently mounted on slides (6,7) moveable to and fro perpendicularly relative to the longitudinal axis of the glass bottle (28), said slides (6,7) being guided in a guide mount (5) moveable up and down parallel to the longitudinal axis (29) of the glass bottle (28), and means for moving the slides (6,7) downwardly while the shaping rollers (15,16) are in working contact with the neck (27) of the glass bottle (28).

2. The apparatus as claimed in claim 1 further including a compressed-air unit (19) having a piston rod (20), said piston rod being connected to the guide mount (5) via an angle lever (21) and a coupling plate (22) for providing the up and down movement to said guide mount (5).

* * * * *